United States Patent
Hook

(10) Patent No.: US 7,540,700 B2
(45) Date of Patent: Jun. 2, 2009

(54) GRAIN CART WITH INTERMODAL CONTAINER LOADER

(75) Inventor: Richard Wayne Hook, West Des Moines, IA (US)

(73) Assignee: Deere & Company, Moline, IL (US)

( * ) Notice: Subject to any disclaimer, the term of this patent is extended or adjusted under 35 U.S.C. 154(b) by 742 days.

(21) Appl. No.: 10/870,247

(22) Filed: Jun. 17, 2004

(65) Prior Publication Data

US 2006/0018742 A1    Jan. 26, 2006

(51) Int. Cl.
*B60P 1/00* (2006.01)

(52) U.S. Cl. .................. 414/505; 414/503; 414/523; 414/526; 414/528

(58) Field of Classification Search .......... 414/546, 414/503, 505
See application file for complete search history.

(56) References Cited

U.S. PATENT DOCUMENTS

| | | | | |
|---|---|---|---|---|
| 2,401,465 A | | 6/1946 | Cwicig ..................... 214/83 |
| 2,676,721 A | * | 4/1954 | Hansen ..................... 414/502 |
| 3,812,607 A | * | 5/1974 | Fenske ..................... 37/420 |
| 3,874,530 A | * | 4/1975 | Purdy ..................... 414/526 |
| 4,144,655 A | * | 3/1979 | Harris ..................... 34/236 |
| 5,407,137 A | * | 4/1995 | Linde et al. ............ 239/675 |
| 5,409,344 A | | 4/1995 | Tharaldson ............. 414/505 |
| 5,538,388 A | | 7/1996 | Bergkamp et al. ...... 414/523 |
| 5,733,094 A | | 3/1998 | Bergkamp et al. ...... 414/526 |
| 5,788,055 A | | 8/1998 | Stewart et al. ........... 198/671 |
| 5,888,044 A | | 3/1999 | Baskerville ............. 414/523 |
| 5,913,667 A | * | 6/1999 | Smilee ..................... 42/94 |
| 5,980,189 A | | 11/1999 | Rubner ..................... 414/505 |
| 6,012,272 A | * | 1/2000 | Dillon ..................... 56/14.6 |
| 6,113,339 A | | 9/2000 | Adams ..................... 414/505 |
| 6,261,050 B1 | | 7/2001 | Kuhns ..................... 414/526 |
| 6,339,917 B1 | * | 1/2002 | Dillon et al. ............ 56/14.6 |
| 6,422,803 B1 | | 7/2002 | Adams ..................... 414/505 |
| 6,484,485 B2 | * | 11/2002 | Dillon ..................... 56/14.6 |
| 6,591,875 B2 | | 7/2003 | Zaun et al. ............... 141/231 |
| 6,632,135 B2 | | 10/2003 | Matousek et al. ....... 460/23 |
| 6,688,971 B2 | * | 2/2004 | Buermann et al. ...... 460/112 |
| 2002/0077163 A1 | * | 6/2002 | Buermann et al. ...... 460/112 |
| 2003/0063968 A1 | * | 4/2003 | Zaun et al. ............... 414/546 |
| 2004/0004544 A1 | | 1/2004 | Knutson ................... 340/539.1 |

OTHER PUBLICATIONS 3 pp, Orthman Grain Cart Brochure dated Jan. 1999.
4 pp, Brent Avalanche™ Grain Cart Brochure, date unknown.

(Continued)

*Primary Examiner*—Saul J Rodriguez
*Assistant Examiner*—Jonathan Snelting

(57) ABSTRACT

A grain cart or similar device for receiving and moving granular agricultural product from a harvester includes bulk filling structure for directly loading an elongated intermodal container. The cart has a frame supported on wheel structure at generally a constant height relative to the surface of the ground, and a grain tank is fixed to the frame. A lift assembly connected to the cart frame adjacent the tank supports a vertically adjustable high speed filling conveyor above the cart hitch. The filling conveyor is operable at a speed sufficient to throw the material along an arcuate path through a side opening in the intermodal container towards the opposite end of the container. The intermodal container can be filled directly from the grain cart with the end of the filling conveyor located outside of the container.

17 Claims, 4 Drawing Sheets

OTHER PUBLICATIONS 1 pp, J&M Grain Carts, Model 1075-22 Front-Folding Auger Cart, date unknown.
1 pp, Killbros 1800 Grain Cart With Tracks brochure, date unknown.
2 pp, Killbros Dual Auger Grain Carts brochure dated 1999.
3 pp, Kinze Auger And Conveyor Grain Wagons & Utility Tracked Chassis, date unknown.
1 pp, HiYield Agricultural Traction Products brochure, date unknown.
2 pp, Highline Turbo Grain Conveyor brochure, date unknown.
3 pp, Batco Belt Conveyors dated Dec. 2000.
3 pp, CAT VFS 50/70 Versatile Flotation System, date unknown.

* cited by examiner

GRAIN CART WITH INTERMODAL CONTAINER LOADER

FIELD OF THE INVENTION

The present invention relates generally to commodity carts such as grain carts for receiving and unloading grain and other granular material and, more specifically, to such carts equipped for bulk filling of containers which are generally closed on the top.

BACKGROUND OF THE INVENTION

Grain carts having a granular material tank or hopper are used extensively in farming operations to receive harvested grain. After filling along the left side of a harvester, the grain cart is moved alongside a truck or other open-top receiving device. Typically, the grain cart includes an attached auger system for moving grain from the lower portion of the grain tank. The auger extends outwardly from the left side of the grain cart and includes an outermost auger section that is hinged for swinging between a storage or transport position adjacent the tank and an extended unloading position. In the unloading position, the auger system moves grain from the tank and out an upper end of the auger section where the grain moves downwardly into the upwardly opening receiving device.

Although numerous types of grain carts with different unloading systems are available, most or all fail to provide for convenient unloading into an intermodal container having a generally closed configuration with an opening in the side of the container. Devices such as shown in commonly assigned U.S. Pat. No. 6,591,875 entitled CART FOR BULK FILLING INTERMODAL CONTAINERS, issued Jul. 15, 2003, provide an intermediate loading arrangement for bulk filling such containers. A high speed variable height conveyor is fed from a hopper which can receive grain from the grain cart auger. The conveyor projects the grain through the side opening to fill a container from the back towards the front. Such a system works well but requires the intermediate cart and a tractor and operator in addition to the conventional grain cart and tractor combination.

In another container filling arrangement shown in commonly assigned U.S. patent application Ser. No. 09/969,203 entitled APPARATUS FOR TRANSPORTING AND FILLING FREIGHT CONTAINERS, a container is supported on a wheeled chassis which is moved through a field to the harvesting device. An onboard high speed conveyor propels grain received from the harvester into the container. Such a system is relatively heavy when the container approaches a filled condition and can cause excess soil compaction in the field. Heavy equipment is required to move the filled container from the chassis onto the transporting vehicle for shipment.

SUMMARY OF THE INVENTION

The present invention provides a grain cart or the like for bulk filling an elongated container with a particulate material. The cart has a frame supported on wheels at generally a constant height relative to the surface of the ground and a grain tank or hopper fixed to the frame. A lift assembly connected to the cart frame adjacent the tank supports a high speed filling conveyor above the cart hitch. The filling conveyor is operable at a speed sufficient to throw the material along an arcuate path through a side opening in the container towards the opposite end of the container. The intermodal container can be filled while the end of the filling conveyor remains outside of the container.

The structure facilitates loading of generally closed containers directly from the cart which receives grain from the harvester without requiring a substantial amount of additional equipment such as an intermediate loading cart and associated towing vehicle. The need to pull a loaded container through the field is eliminated so that soil compaction is reduced. If desired, the intermodal container can be loaded directly from the grain cart while the container rests on the truck or trailer that will transport the filled container to the next destination to thereby reduce handling of heavy loaded containers.

In the embodiments shown, the lift assembly maintains the filling conveyor on the cart at a constant angle which is best suited for propelling the grain towards the rear of the container while allowing the path of the grain to be adjusted vertically to accommodate different container opening heights. In one or more of the illustrated embodiments, the cart includes an unloading auger arrangement in addition to the high speed filling conveyor and may be used for normal open top loading as well as for side opening intermodal container loading. In another embodiment, a bucket or flighted conveyor moves material directly from the hopper to the filling conveyor, and flighted augers are eliminated to reduce grain damage.

These and other objects, features and advantages of the present invention will become apparent upon reading the following detailed description in view of the drawings.

DESCRIPTION OF THE PREFERRED EMBODIMENT

Figure 2:
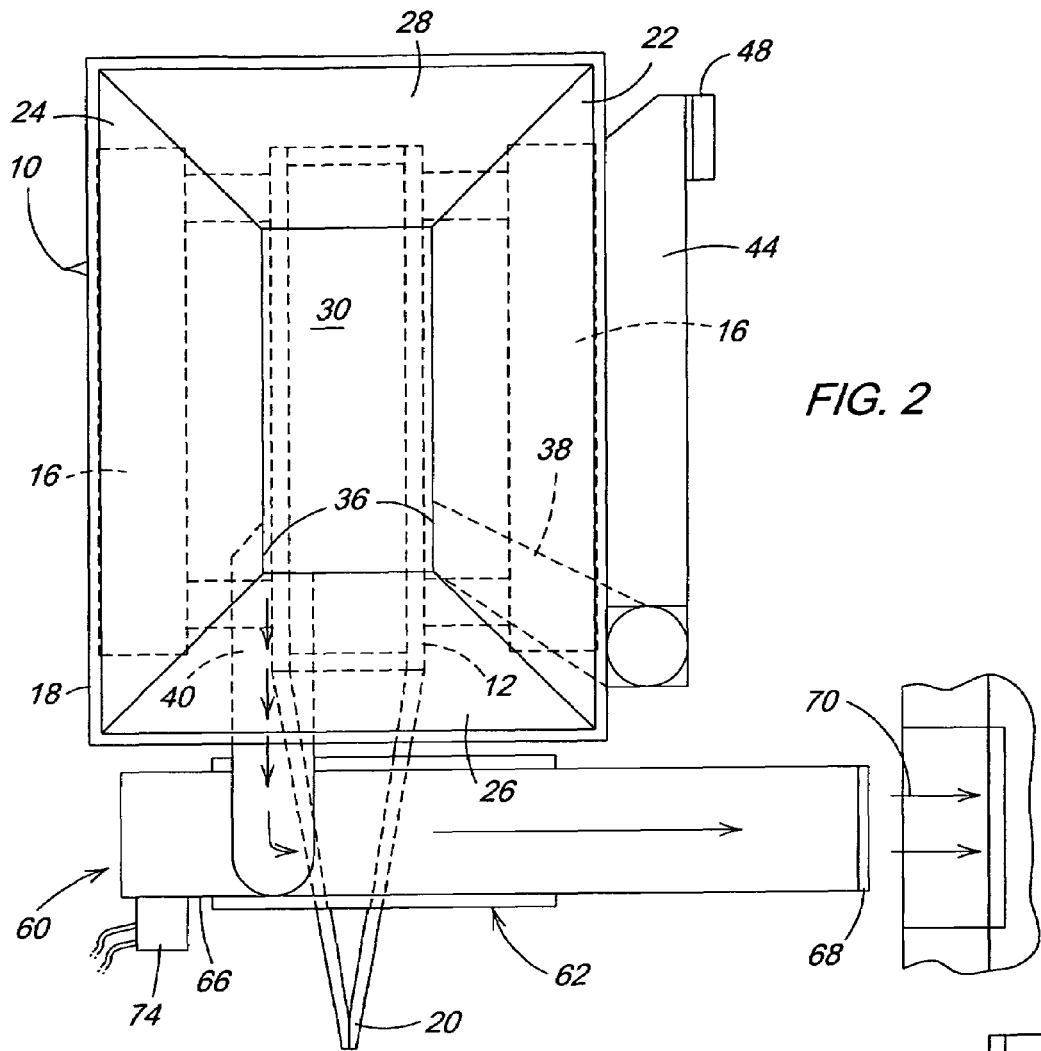
FIG. 2 is a top view of the grain cart of FIG. 1.
Figure 1:
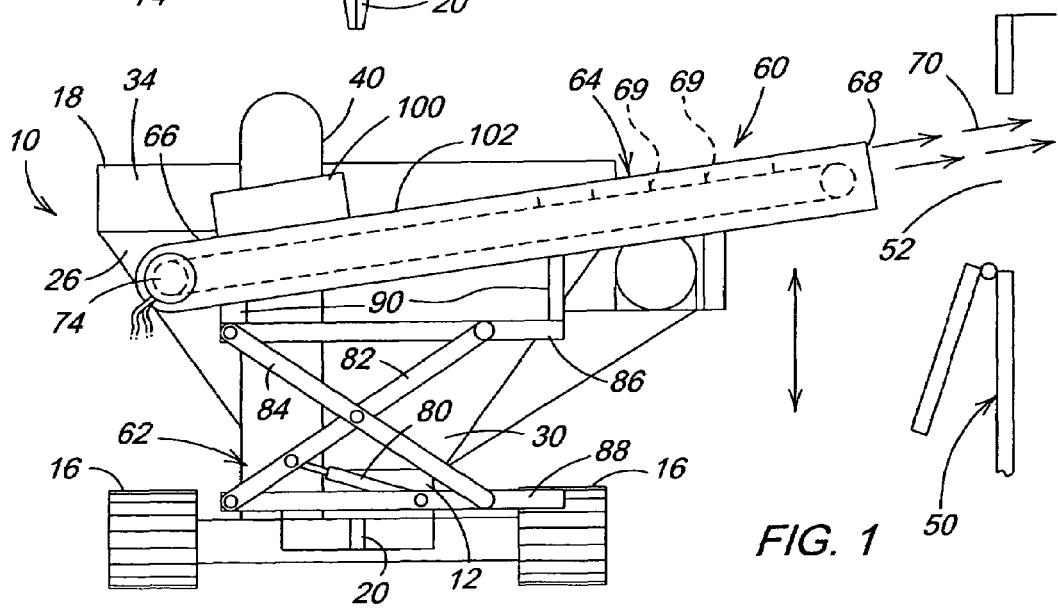
FIG. 1 is a front view of a grain cart having a high speed unloading conveyor.

Referring to FIGS. 1 and 2, therein is shown a grain cart 10 having a main frame 12 supported for movement over a field by wheel structure 16. The wheel structure 16 is shown as a tracked device but it is to be understood that other types of ground support could also be utilized with the present invention. A grain tank or hopper 18 or similar receptacle is supported from the frame 12, and a forward towing hitch 20 is connected to the frame 12 for towing of the cart 10 to and from a filling location such as alongside a combine harvesting grain in a field.

The hopper 18 includes left and right side walls 22 and 24 connected by front and rear end walls 26 and 28. Side wall extensions 34 project vertically from upper edges of the side walls to provide added cart hopper capacity. The walls 22-28 converge downwardly and inwardly to a lowermost hopper portion 30 having one or more exit areas 36 which open into intermediate conveyor structure 38 and 40 for conveying material upwardly and outwardly from the lowermost hopper portion.

As shown in FIGS. 1 and 2, the grain cart 10 includes a conventional auger type conveyor 44 located on the left hand side of the cart and pivotable from a transport or storage position (shown) alongside the side wall 22 to an outwardly extending operating position extending outwardly to the left of the cart. When extended, the conveyor 44 receives grain from the intermediate conveying structure 38, which typically is an auger section, and conveys the material outwardly to an end spout 48 where the material drops into an open-top receptacle such as the trailer on a large capacity transport vehicle.

To facilitate efficient transfer of the material in the hopper 18 to a container which is filled other than through an open top, such as an intermodal container 50 (FIG. 1) with an upper side opening 52, a special filling conveyor assembly 60 is supported on the cart 10. The assembly 60 includes a vertically adjustable lift assembly 62 supported from the frame 12 above the hitch 20. A high speed belt conveyor 64 is supported by the lift assembly 62 and angles upwardly at generally a constant angle of approximately 15 degrees relative to the horizontal from an inward or proximal end 66 to a discharge or distal end 68. The lift assembly 62 is adjusted so the discharge end 68 opens directly towards the side opening 52.

The intermediate conveyor structure 40 directs material from the lowermost hopper portion 30 upwardly and forwardly onto the inward end 66 of the belt conveyor 64. The belt conveyor 64 includes a troughed and cleated belt 69 generally of the type shown and described in the aforementioned U.S. Pat. No. 6,591,875. The belt 69, operable at a speed sufficient to propel material along an arcuate path 70 through the side opening 52 towards the opposite end of the container, may be driven mechanically by a PTO on the towing vehicle or hydraulically or electrically by a motor 74. The motor 74 may be a hydraulic motor powered from the hydraulic system on the towing vehicle or from a PTO driven pump.

A combination of belt speed and conveyor angle has been developed to optimize unloading. A belt speed of approximately 1700-2300 feet per second with the conveyor angle of approximately 15 degrees effectively propels the material along the path 70 towards the end of the container 50 so the container fills from the rear without excessive contact with the top of the container and without need to project the end 68 into the container. Other types of filling conveyors could be used, such as a pneumatic conveyor, but the belt conveyor tends to be more efficient. For more details of the conveyor construction, reference may be had to the U.S. Pat. No. 6,591,875.

The lift assembly 62 is shown as a scissors lift having a hydraulic cylinder 80 connected to one link 82 of a pair of scissors links. A second link 84 is pivotally connected to the first link 82 and to one end of a horizontal conveyor support frame rail 86. The lower end of the link 84 is slidably received in a horizontal lower rail 88. The upper end of the link 82 is slidably received in the support frame rail 86. Extension of the cylinder 80 raises the rail 86 while retraction lowers the rail. Vertical supports 90 secure the filling conveyor assembly 60 to the lift assembly 62 with the desired angle of inclination.

The intermediate conveyor structure 40 is enclosed with a telescoping or flexible housing 100 (FIG. 1) which opens downwardly into a conveyor housing 102 at the inward end 66 of the assembly 60. The housing 100 facilitates substantial vertical movement of the filling conveyor assembly 60 to accommodate openings 52 of varying heights.

To fill the intermodal container 50, the conventional auger 44 is maintained in the storage position shown in FIG. 2, and the cart 10 is driven alongside the container 50 with the end 68 generally aligned with the opening 52. The hydraulic cylinder 80 is actuated as necessary to assure proper vertical alignment of the path 70 with the opening 52. The drive or motor 74 is actuated to drive the high speed belt conveyor 64 at the desired speed, and the intermediate conveyor structure 40 is driven to deposit material from the hopper 18 on the inward end 66 of the belt 69. The material, accelerated and maintained on the belt by the cleats, is propelled out the open end 68 of the conveyor housing 102. For conventional unloading into an open top receiver, the auger 44 is pivoted outwardly to the working position and driven with the intermediate conveyor structure 38, which can be a lowermost auger section, while the structure 40 and conveyor assembly 60 remain unpowered.

Figure 3:
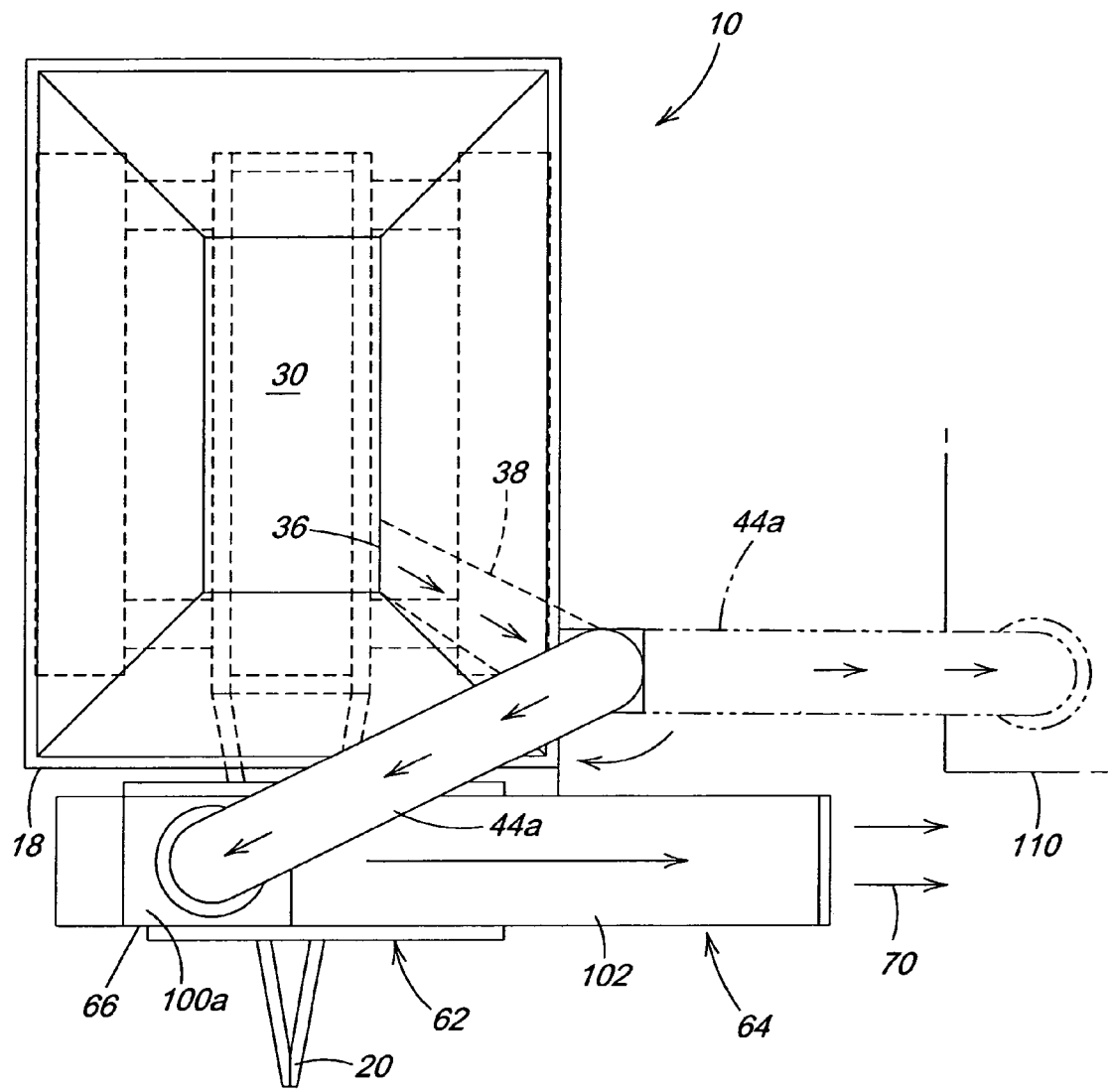
FIG. 3 is a view similar to that of FIG. 2 but showing an alternate embodiment with an intermediate conveyor assembly feeding the unloading conveyor.

In the embodiment shown in FIG. 3, one of the intermediate conveyor structures is eliminated, and a pivoting top loading auger 44a is utilized to selectively direct material from the conveyor structure 38 either to the inward end 66 of the high speed belt conveyor 64 (solid lines) through an adjustable housing 100a or to an open top receptacle 110. The auger 44a is movable from a storage location adjacent the hopper 18 outwardly to the open top dump position (broken lines) or to the side fill position (solid lines) over the high speed belt conveyor 64.

Figure 4:
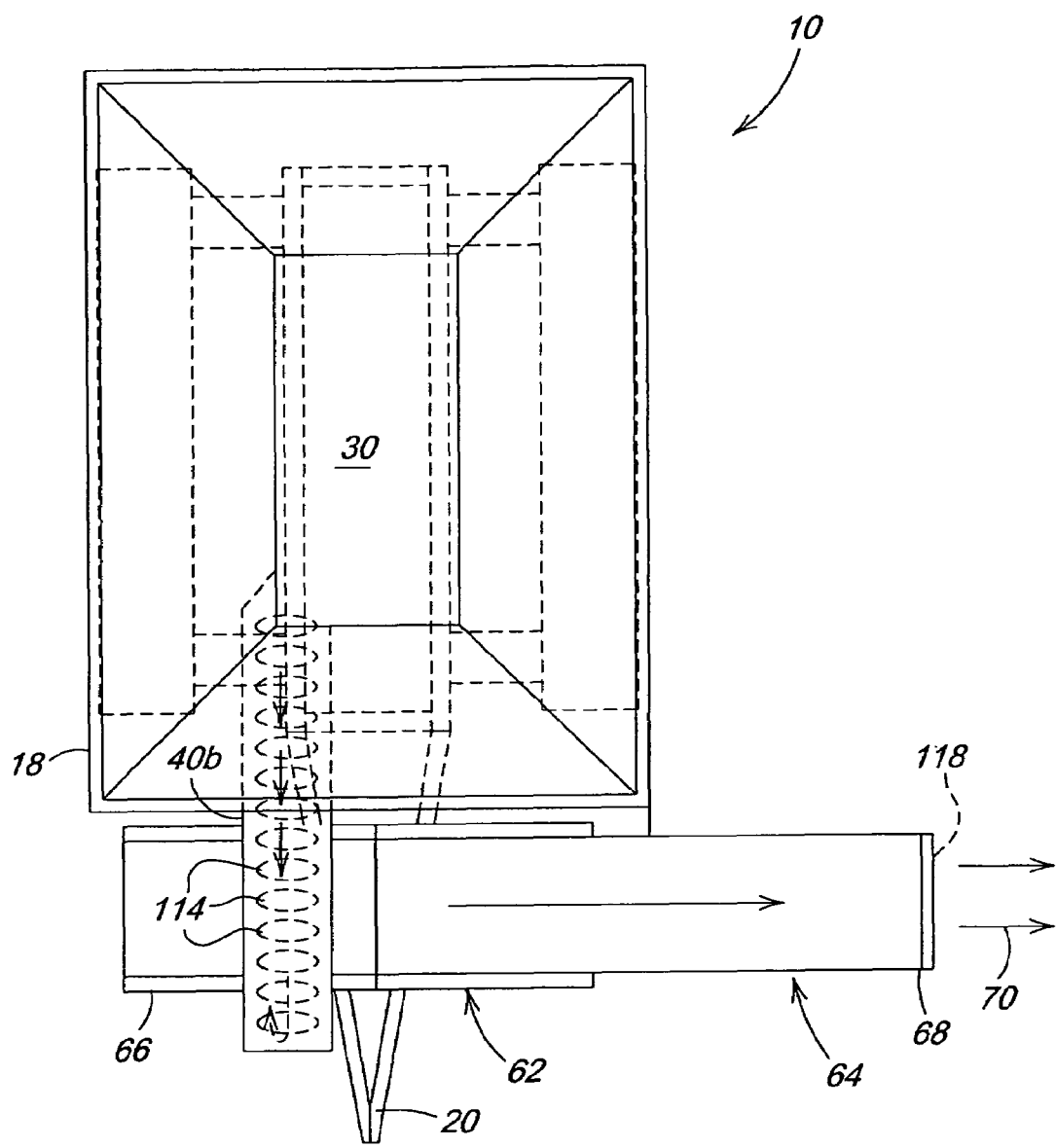
FIG. 4 is a top view of another alternate embodiment of the grain cart showing a generally flightless unloading system.

FIG. 4 shows another embodiment of a grain cart 10 which is primarily dedicated to container or side loading. The grain cart 10 is equipped with a high capacity conveyor 64 for container loading but does not include a conventional top loading conveyor device such as a side unloading auger. A conveyor 40b extends from the lowermost hopper portion 30 upwardly and forwardly over the inward end 66 of the conveyor 64. The conveyor 40b is shown as a bucket conveyor with individual buckets or receptacles 114 for scooping grain from the hopper 18 as the receptacles are driven in a loop around the front portion of the hopper and over the conveyor 64. The receptacles 114 are inverted over the end 66 so that the grain is deposited on the belt 69 for delivery to the container. Other types of intermediate conveyors such as augers and flighted conveyors could also be used to deliver grain from the hopper to the filling conveyor 64, but the bucket conveyor 40b provides a gentler grain handling system that substantially reduces grain damage, particularly in combination with the belt 69. A cushioned deflector device may be supported at location 118 offset from the distal end of the belt conveyor for directing grain downwardly from the end 68 if necessary to fill a more conventional receptacle with an upwardly directed opening.

Figure 5:
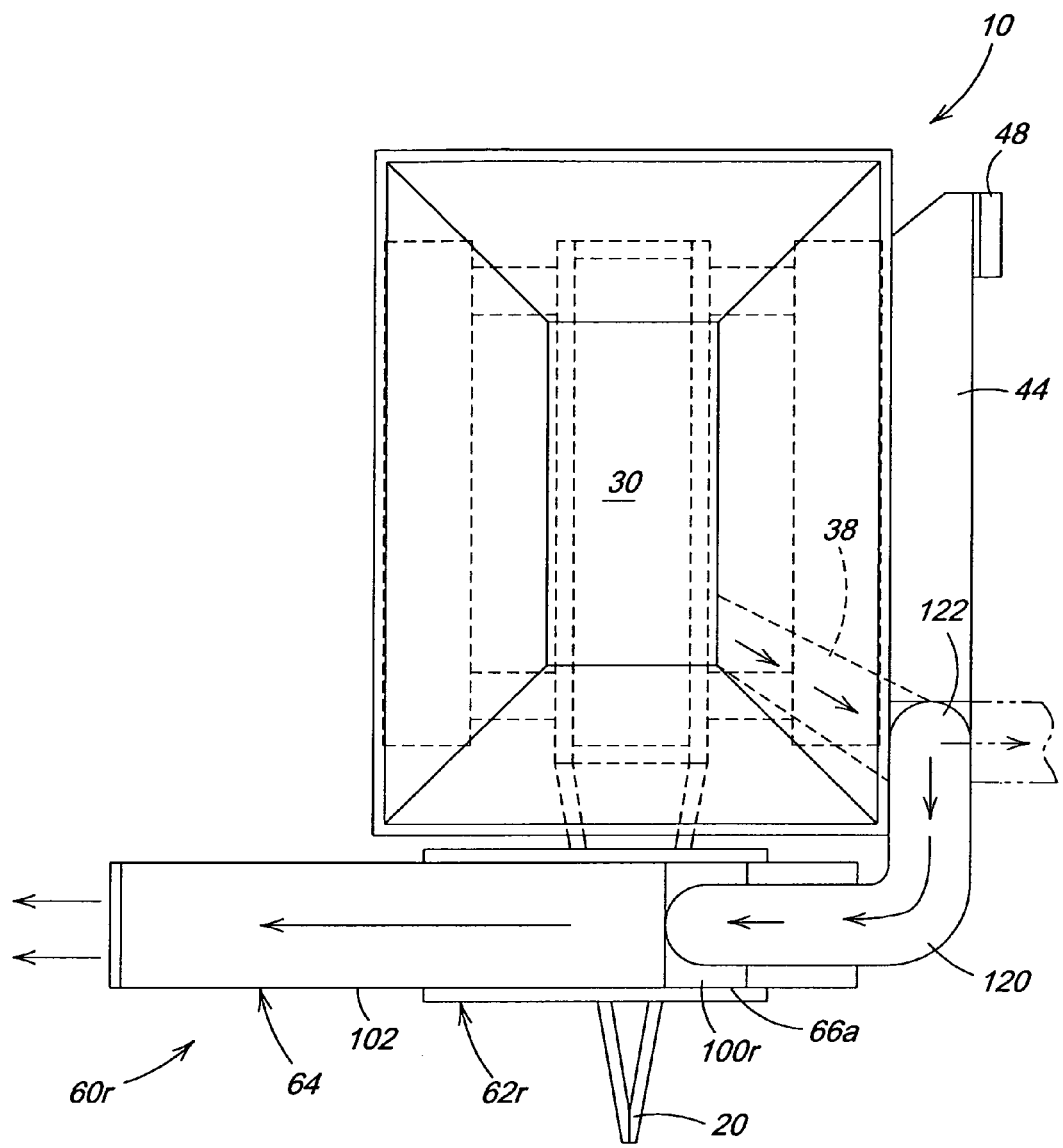
FIG. 5 is a top view of an embodiment of the grain cart having a conventional unloading system on one side and a high speed unloading conveyor for delivery of the material to a container positioned on the opposite side of the cart.

A system for converting a conventional grain cart with a movable unloading auger to a side loading cart system is shown in FIG. 5. The conventional auger unloading system includes the lower auger system 38 feeding and driving a pivoting left side auger conveyor 44 when the auger conveyor is in the normal unloading position (broken lines). In addition, a right side filling conveyor assembly 60r is supported from a lift assembly 62r located above the hitch 20. The assembly 60r is similar in construction to the assembly 60 described above but angles upwardly towards the right side of the cart rather than to the left side. A connecting conveyor 120 includes a receiving end 122 which connects with the upper end of the lower auger system 38 when the auger conveyor 44 is pivoted to the storage position shown. The connecting conveyor extends to a flexible or extensible housing 100r which opens into the conveyor housing 102 above the inward end 66a of the filling conveyor assembly 60r. Therefore, the grain cart 10 can be used in a conventional manner to load material into an upwardly opening receiver 110 at the left of the cart using the auger conveyor 44, or the filling conveyor assembly 60r can be fed from the connecting conveyor to fill a container to the right of the cart.

Having described the preferred embodiment, it will become apparent that various modifications can be made without departing from the scope of the invention as defined in the accompanying claims.

The invention claimed is:

1. Apparatus for bulk filling an elongated container with a material, the container having a first end with an opening, the apparatus comprising:
   a cart having a cart frame supported on wheel structure and a forward hitch for movement over a ground surface in a forward towing direction, the wheel structure maintaining the cart frame at a generally constant height relative to the surface both in a towing mode and an unloading mode, and a receptacle with upright walls fixed to the frame, the receptacle extending above the frame between an uppermost portion and a lowermost portion and receiving the material;
   a lift assembly connected to the cart frame adjacent the lowermost portion of the receptacle;
   a filling conveyor supported on the lift assembly and receiving material from the receptacle, the conveyor having a proximal end and a distal end, the filling conveyor angled upwardly from the proximal end to the distal end, the distal end extending away from the receptacle;
   wherein the conveyor extends in a conveying direction transversely to the forward towing direction;
   wherein the filling conveyor is operable at a speed to throw the material upwardly and outwardly along an arcuate path through the opening and into the container along the arcuate path whereby the container is generally fillable from the receptacle with the distal end of the filling conveyor located outside of the container at one side of the container; and
   wherein the lift assembly is movable relative to the frame to raise and lower the conveyor vertically relative to the receptacle at a generally constant angle between the uppermost and lowermost portions of the receptacle to accommodate the opening at various heights, wherein in an upper position the conveyor is located adjacent the uppermost portion of the receptacle and wherein the conveyor is movable downwardly with the lift assembly at the generally constant angle from the upper position to the lowermost portion of the receptacle.

2. The apparatus as set forth in claim 1 wherein the lift assembly maintains the conveyor at a predetermined angle of inclination of approximately 15 degrees as the conveyor is raised and lowered, and wherein the proximal end is supported between sides of the receptacle adjacent the lowermost portion and the distal end extends outwardly of the sides adjacent the uppermost portion.

3. The apparatus as set forth in claim 1 including an intermediate conveyor located between the receptacle and the filling conveyor and moving the material from the receptacle to the conveyor.

4. The apparatus as set forth in claim 3 wherein the intermediate conveyor includes an auger selectively movable between an auxiliary dump position wherein the auger projects outwardly to one side of the receptacle for filling an open top container located along the side of the receptacle and a conveyor dump position over the filling conveyor for filling the elongated container from the filling conveyor.

5. The apparatus as set forth in claim 4 wherein the auger, when in the auxiliary dump position, is located opposite the distal end of the filling conveyor, the auger and the filling container facilitating unloading of the receptacle from opposite sides of the cart.

6. The apparatus as set forth in claim 1 wherein the cart includes an unloading device for unloading the material into an upwardly opening receiver independently of the filling conveyor, and means for selectively directing material from the receptacle to the unloading device or to the filling conveyor.

7. The apparatus as set forth in claim 6 wherein the filling conveyor comprises a belt conveyor having a belt operating speed within a range of speeds between 1700 to 2300 feet per minute, and wherein the means for selectively directing material comprises an auger movable between an auxiliary dump position outwardly of the receptacle to a position over the proximal end of the filling conveyor.

8. The apparatus as set forth in claim 7 wherein the auxiliary dump position is located on a side of the cart opposite the proximal end of the filling conveyor so that the cart can be unloaded from opposite sides of the receptacle.

9. A grain cart for conveying grain comprising:
   a frame supported for movement over ground in a forward direction;
   a receptacle supported on the frame and including walls having an uppermost portion and a lower portion;
   a first auger section connected to the lower portion for moving the grain from the lower portion;
   a second auger section located at least in part outside the receptacle;
   a conveyor lift connected to the frame;
   a high speed conveyor connected to the conveyor lift and extending away from the receptacle from an inward end to a distal end in a direction transverse to the forward direction, the high speed conveyor having an angle of upward inclination in a direction of the distal end and operable to propel the grain upwardly and outwardly from the grain cart, the conveyor lift movable vertically from a position adjacent the uppermost portion of the receptacle to the lower portion of the receptacle to vary height of the distal end relative to the receptacle, wherein the lift assembly maintains the conveyor at a predetermined angle of inclination as the conveyor is raised and lowered between the uppermost and lower portions; and
   means for selectively directing the moved grain from the first auger section to the second auger section for unloading the grain from the grain cart directly from the second auger section independently of the conveyor and from the first auger section to the conveyer for unloading the grain from the grain cart into a container directly from the conveyor; wherein when unloading of the grain from the grain cart independently of the conveyor is selected, the conveyor is offset a substantial distance from the second auger section.

10. The grain cart as set forth in claim 9 wherein the means for selectively directing the moved grain comprises an intermediate conveyor.

11. The grain cart as set forth in claim 9 wherein the high speed conveyor comprises a belt conveyor having a belt operating speed between 1700 to 2300 feet per minute.

12. The grain cart as set forth in claim 11 wherein the angle of upward inclination is approximately 15 degrees.

13. The grain cart as set forth in claim 9 including a forward hitch for connecting the frame to a towing vehicle, and wherein the conveyor lift comprises hydraulically operated scissor links located above the hitch and moving the conveyor relative to the frame and the receptacle at the predetermined angle.

14. A cart for bulk filling an elongated container offset from the cart with a material, wherein the container has a first end with an opening and extends inwardly from the opening, the cart comprising:

a cart frame supported on wheel structure for movement in a forward direction over a ground surface at a generally constant height relative to the surface;

a forward towing hitch connected to the frame:

a receptacle fixed to the frame, the receptacle receiving particulate material;

a lift assembly connected to the cart frame adjacent the receptacle, the lift assembly comprising scissor links supported on the forward towing hitch;

a belt conveyor supported on the lift assembly and receiving material from the receptacle, the belt conveyor having a proximal end and a distal end and angled upwardly from the proximal end to the distal end at a conveyor angle of about 15 degrees, the conveyor extending transversely to the forward direction;

wherein the belt conveyor includes a belt operable at a speed of greater than 1700 feet per minute to throw the material along an arcuate path upwardly and outwardly towards the opening and through the opening inwardly into the container along the arcuate path, whereby the container is generally fillable from the receptacle with the distal end of the belt conveyor located outside of the container; and wherein the lift assembly is movable relative to the frame to raise and lower the conveyor relative to the frame and the receptacle to accommodate the opening at various heights while maintaining the conveyor angle and the scissor links maintain the conveyor at a generally constant angle of inclination as the lift assembly raises and lowers the conveyor.

15. The cart as set forth in claim 14 further comprising an unloading device offset from the distal end of the belt conveyor for directing material from the receptacle to an alternate container.

16. The cart as set forth in claim 14 including an intermediate conveyor for selectively directing the material from the receptacle to either the proximal end of the belt conveyor or a second location on the cart for filling an alternate container.

17. The cart as set forth in claim 16 wherein the intermediate conveyor includes an unloading end selectively movable from a storage position at one side of the cart outwardly to a first unloading position rearwardly of the distal end or to a second unloading position adjacent the proximal end.

\* \* \* \* \*